United States Patent Office 3,217,741
Patented Nov. 16, 1965

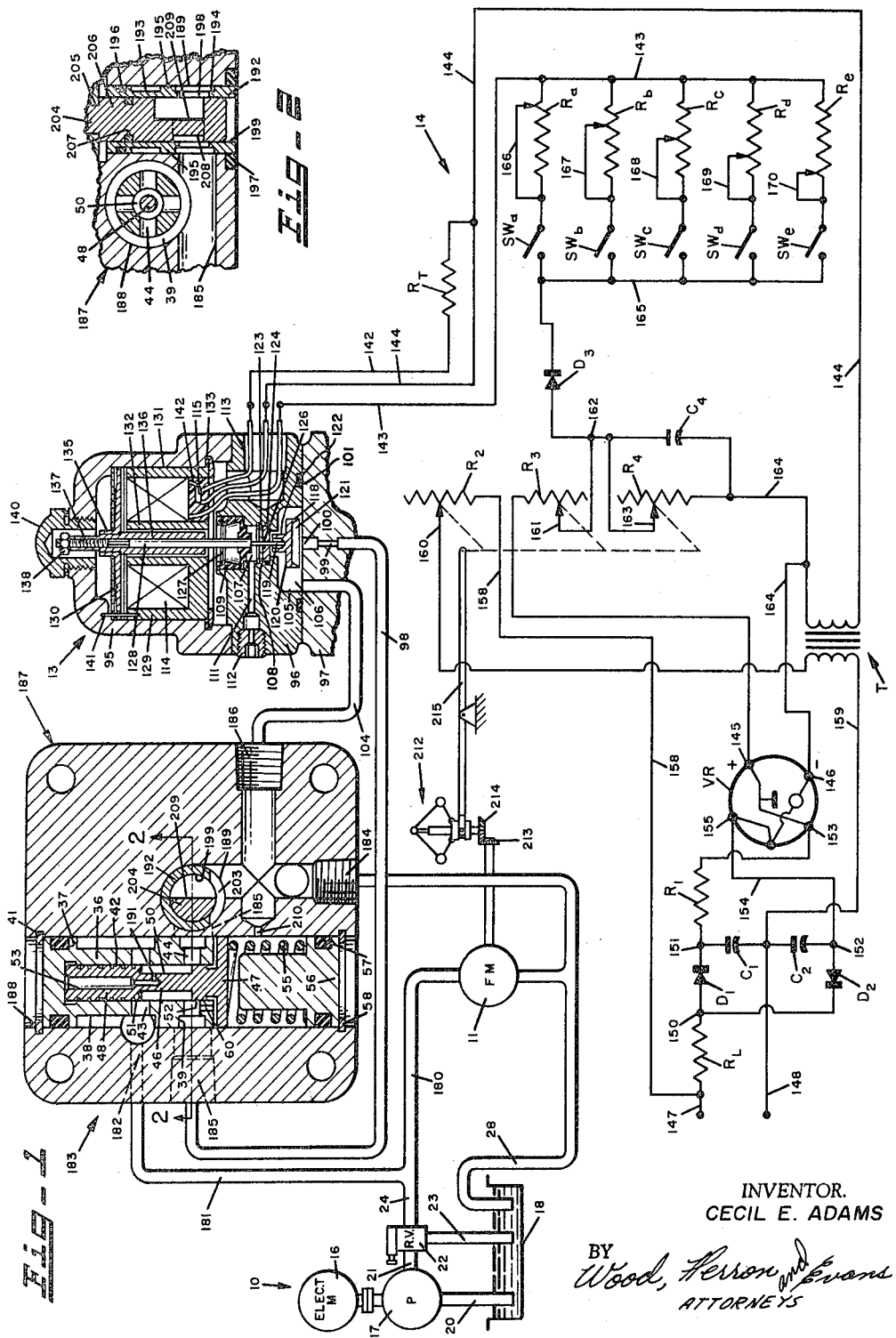

3,217,741
ELECTROHYDRAULIC FLOW CONTROL
APPARATUS
Cecil E. Adams, Columbus, Ohio, assignor to American Brake Shoe Company, New York, N.Y., a corporation of Delaware
Original application Apr. 4, 1961, Ser. No. 100,753, now Patent No. 3,159,178, dated Dec. 1, 1964. Divided and this application Oct. 24, 1963, Ser. No. 318,573
5 Claims. (Cl. 137—501)

This invention relates to apparatus for adjustably controlling the rate of flow of hydraulic fluid under pressure. More particularly, the invention relates to electrically controllable apparatus for adjustably regulating the rate of flow of hydraulic fluid under variable pressure conditions.

This application is a division of my co-pending application Serial No. 100,753, filed April 4, 1961, now Patent No. 3,159,178, issued December 1, 1964.

Devices for regulating the flow of hydraulic fluid have utility for a wide variety of purposes. For example, such devices are commonly employed to permit only a fixed number of gallons of fluid per minute to flow to a hydraulic motor, thereby maintaining the speed of rotation of the motor at a fixed number of revolutions per minute. As another example, it is often desirable to admit fluid at a constant flow rate to the cylinder of a hydraulic ram so that the ram will advance at constant speed regardless of variations it may encounter in the resistance presented to it by a workpiece.

While there have heretofore been available flow control devices which permit adjustment or change in the volume of flow which they permit to pass in unit time, it has usually been necessary to make such adjustments manually, as by loosening a lock nut, changing the relative position of an orifice-forming element, and then retightening the nut. For obvious reasons, it has been difficult to make such adjustments remotely. Moreover, it has been difficult quickly to set previous flow control devices to maintain the flow rate at a precise preselected numerical value. For example, if it is desired, say, to maintain a flow rate of 4 gallons per minute to a hydraulic motor, the flow control apparatus must usually be set so that the flow rate will approximate the desired value. With the apparatus thus set, the actual flow must then be measured and the setting of the apparatus "inched" to a better approximation of the desired rate. That this type of adjustment has been difficult to effect remotely can also be appreciated.

In contrast to such past devices, this invention is directed to flow control apparatus which is electrically controllable and by which the volume of fluid supplied to a work load may be remotely adjusted to, and automatically maintained at, a preselected value with very high accuracy and with very low variation.

Broadly speaking, the flow control apparatus of this invention includes structure forming a main orifice, structure forming a pilot or trimmer orifice, fluid passageways through which fluid under pressure is supplied to the respective inlets of the main and pilot orifice structures, and pressure differentially operated means whereby the pilot or trimmer orifice structure is rendered effective to control the total flow of fluid through the flow control apparatus.

More specifically the invention comprises a main flow orifice assembly, a pressure regulator assembly, and a trimmer or pilot valve. The main flow orifice assembly includes a body having an inlet port and an outlet port and structure forming an adjustable or variable orifice between those ports the area of which can be varied. The pressure regulator assembly maintains a constant pressure differential or pressure drop between the pressure of fluid at the inlet and outlet ports of the main flow orifice assembly. The trimmer or pilot valve includes a body having a bore, an inlet port and an outlet port, a movable valve member for establishing a pressure drop between the inlet and outlet ports, and an electromechanical transducer for actuating the valve member which delivers a substantially constant force for a given electrical input thereto in a direction tending to close the pilot valve. A fluid passageway communicates between the inlet port of the main flow orifice assembly and the inlet port of the trimmer or pilot valve, and a second passageway communicates between the outlet port of the main orifice assembly and the outlet port of the trimmer, one of these two fluid passageways including a flow restrictor for throttling flow through the trimmer.

These and other aspects of the invention may best be described by reference to the accompanying drawings, in which:

FIGURE 1 is a schematic diagram of a hydraulic system in accordance with a preferred form of the invention, incorporating a two-port flow control apparatus in a bleed-off circuit for very accurately regulating the flow to a fluid motor, including a cross-sectional view of an electrohydraulic "trimmer," electric circuitry for controlling the setting of the trimmer, and a cross-sectional view of a flow metering assembly; and FIGURE 2 is a horizontal section through the flow metering assembly on line 2—2 of FIGURE 1.

In FIGURE 1 of the drawings there is shown a system in accordance with the invention for supplying hydraulic fluid under pressure to a fluid motor whereby the motor is moved or turned at a very accurately controlled rate. The operation of this system is controlled by an electrical input supplied to it. It can be set, by closing an appropriate switch, to provide any of a number of preselected operating ranges over each of which the rate of movement can be either gradually varied or set at any value in the range simply by adjusting a variable resistor. In accordance with this system, an adjustable orifice is pre-adjusted to establish a flow approximating the flow which is actually desired, while a "trimmer" valve connected in parallel with the variable orifice enables the total flow to be very closely regulated and maintained electrically to within 1% or less of the actual value desired.

Broadly speaking, the system of FIGURE 1 includes a source 10 of fluid under pressure, a work load 11 which for purposes of illustration is taken to be a fluid motor, a main flow metering assembly designated by 183, a trimmer or pilot valve 13, and an electric circuit 14 for operating and controlling the pilot valve 13.

Referring to the figure in detail, the source of fluid pressure 10 is conventional and may comprise an electric motor 16 driving a hydraulic pump 17. The pump receives hydraulic fluid from a tank 18 through a conduit 20, and discharges fluid under pressure into a conduit 21. This conduit 21 is connected to tank 18 through a relief valve 22 and a conduit 23. These elements 16–23 will be understood to represent a conventional source of fluid under pressure by which the work load 11 is operated.

Conduit 24 is connected to fluid motor 11 through conduit 180. The low pressure side of fluid motor 11 is connected to tank 18 through conduit 28. A bleed-off or bypass conduit 181 is connected at one end to conduit 24 and at the other end to the inlet port 182 of the main flow metering assembly 183. The main flow metering assembly 183 has a tank port 184, a high pressure pilot inlet port 185 and a low pressure pilot port 186 which communicates with tank port 184.

Thus, the main flow metering assembly and the trimmer valve are connected in parallel with the fluid motor in a bleed-off or by-pass circuit between the high pressure conduit and the tank. The flow to the fluid motor is equal to the flow from the pressure source minus that which is passed by the main flow metering assembly and the trimmer; by metering the flow which is by-passed around the fluid motor, the main flow metering assembly and trimmer thereby determine the total flow to the fluid motor. Those skilled in the art will recognize that this system is of the "two-port, meter-out" type.

The main flow metering assembly, as will be explained is preset to permit flow of a constant fixed amount to pass. Since in practice it is difficult to set the main flow metering assembly to provide exactly the by-pass flow desired, the trimmer or pilot valve is employed to bring the total by-pass flow very accurately to the desired value and to maintain it at that value within narrow limits regardless of pressure fluctuations. For that reason the trimmer can be thought of as a secondary flow metering assembly which operates in conjunction with the main flow metering assembly 183.

Main flow metering assembly 183 includes a body 187 in the form of a block which may in practice be integral with block 97 upon which the pilot valve 13 is mounted, although the two are shown separately in the drawing for clarity. The body 187 is provided with two through bores 188 and 189, the axes of which extend at right angles to each other and are spaced apart. Bore 188 contains elements which cooperate to form pressure compensating or regulating means, while bore 189 contains elements which cooperate to form a variable orifice by which the rate of flow of fluid is directly controlled or metered.

The elements contained within bore 188 include a cylindrical element 36 having spaced circumferential grooves 37, 38, and 39 formed therein, which is inserted into one of the open ends of bore 188 and is retained therein by a snap ring 41. The cylinder 36 is sealed to the bore by an O-ring contained within groove 37 which is adjacent snap ring 41. Cylindrical 36 also includes a central axially extending bore 42 which extends upwardly toward but not through its upper end which is connected to grooves 38 and 39 by passages or ports 43 and 44 respectively. Groove 38 communicates with inlet port 182, and groove 39 communicates with port 185.

A compound piston element 46 is also contained within bore 188 and includes a piston head 47 of diameter equal to that of bore 188 and a small diameter shank 48 which extends up and reciprocates within bore 42 of cylinder 36. This shank 48 is provided with a circumferential groove 50 flanked by a pair of lands 51 and 52. Land 51 functions merely as a guide or bearing for the compound piston 46 and never closes port 43. Land 52 cooperates with port 44 to form a valve for controlling the flow of fluid through port 44 in accordance with the vertical position of the sharp upper peripheral edge of the land which is adjacent groove 50. The compound piston 46 is provided with a vertical bore 53 which extends downwardly from its upper end and communicates through a lateral drilling 191 with groove 50.

The piston 46 is urged upwardly to the position shown in FIGURE 1 by a spring 55 which abuts the piston head 47 and a block 56. Spring 55 is a low rate spring; that is, the force it supplies when compressed is relatively independent of the degree of compression it has undergone. The block 56 is inserted into the other open end of bore 188, sealed by an O-ring 57, and is retained in the bore by a snap ring 58. The block 56 forms an abutment which limits the downward movement of the piston 46 in bore 188. The chamber formed in the bore between the upper face of the piston head 47 and the adjacent end of cylindrical element 36 is connected with groove 39 by a passage 60 formed in the cylindrical element and extending from port 44 to the bottom of element 36.

The elements in bore 189 which cooperate to form the adjustable orifice include a sleeve 192 which has a close fit with the bore. This sleeve 192 is provided with two circumferential grooves 193 and 194 (see FIGURE 2) which are separated by a land 195. The upper end of sleeve 192 is sealed by an O-ring 196 contained in a groove formed in the sleeve. Another O-ring 197 lies in a groove formed in body 187 around the lower end of the sleeve 192 and is held therein by suitable means not shown.

Groove 194 in sleeve 192 communicates with the axial bore 199 of the sleeve by ports 198 formed through the wall of the sleeve, and groove 193 is connected to bore 199 by a slot 203 having sharp edges where it joins bore 199. Bore 199 is cylindrical and receives a valve element 204 which is adjustable both longitudinally and rotationally in the bore. This element 204 comprises two cylindrical portions 205 and 206 of different diameters separated by a shoulder. The larger diameter portion 206 fits closely but movably in the interior 199 of sleeve 192 to form a substantially fluid tight fit therein and is provided with a circumferential groove 207 adjacent the shoulder in which there is an O-ring for preventing the loss of fluid along its surface toward the shoulder. As can best be seen from FIGURE 2, the lower portion 206 of valve element 204 is also provided with a circumferentially extending groove 208 which communicates with bore 199 in sleeve 192. This groove 208 is intersected by a slot 209 extending at right angles to the axis of the valve element 204. The depth of this slot 209 is such that the bottom of the slot lies substantially on the axis of the valve element 204, and the axial dimension of the slot is greater than that of groove 208. The lowermost side wall of slot 209 is coplanar with the lowermost side wall of groove 208, while the uppermost side wall of slot 209 lies in a plane above the plane of the uppermost side wall of groove 208, defining a solid semi-circular portion where it joins the walls of slot 209. This slot 209, upon rotational or axial adjustment of valve element 204, serves to adjust the area of the adjustable orifice formed by it and rectangular slot 203. Means for adjusting and securing the position of slot 209 with respect to slot 203 are not shown in the drawing but may, for example, comprise a lock nut threaded on the upper portion 205 of valve element 204 which is engageable with body 187.

By reference to FIGURE 2, it can be seen that when the valve element 204 is moved upwardly in bore 189, the effective width of slot 203 will be changed, and when valve element 204 is rotated, one or the other ends of slot 209 and the valve element will function to adjust effective length of slot 203. The inlet or trimmer valve 13 employed in this system is mounted on block 97 which includes an inlet passageway 98 connected to high pressure pilot port 185 of the main flow metering assembly 183. Block 97 also contains an outlet passageway 104 which is connected to the low pressure pilot port 186.

The pilot valve 13 is housed in a body comprised of two elements 95 and 96 which are connected by screws not shown. The lower body element 96 is provided with a flat bottom surface for mounting atop block 97 which, as explained, can in practice be contiguous with the main flow metering assembly 183. An O-ring 101 in a groove in the lower surface of body element 96 forms a seal with the top surface of block 97. Inlet passageway 98 extends from port 185 of the flow metering assembly 183 through a restricted orifice 99 to the upper surface of block 97 where it forms an inlet port 100. Outlet passageway 104 opens on the top surface of block 97 at a position spaced from inlet port 100.

The lower body element 96 of the pilot valve is provided with a stepped vertical bore 105 which is axially aligned with port 100 and which is enlarged at its lower end to communicate with the outlet passageway 104. This bore 105 is divided into two chambers, one a wet chamber 106 and the other a dry chamber 107, by a seal and guide assembly 108 and a diaphragm 109 in the form of a flexible boot. Bore 105 is joined below this boot 109 by a horizontally extending bore 111 which is partially closed by a breather or vent plug 112. Body element 96 is also provided with a passageway 113 through which pass insulated wires connected to the electric coil 114 and thermistor 115 of an electro-mechanical transducer assembly contained in body member 95.

A movable valve element or poppet 118 is contained within the wet chamber 106 and is mounted on the lower end of an operating rod 119 which extends through the seal and guide assembly 108. This valve element 118 has a large diameter head 120 provided with a downwardly extending peripheral flange 121 which tapers downwardly to a relatively sharp edge. Above head 120, valve element 118 is provided with a shank of small diameter in which is formed a cup 122 in which the lower end of operating rod 119 is loosely received. Together with port 100 of bore 98, poppet 118 forms a valve assembly which acts on fluid flowing from inlet port 100 to outlet passageway 104 to create a back pressure at port 100. The particular construction shown is preferred for this valve because it is self-cleaning and presents a relatively large area to the pressure of fluid at port 100, but it is contemplated that other suitable constructions may be employed.

The seal and guide assembly 108 includes a circular disk 123 having cylindrical outer walls. This disk is inserted into that portion of bore 105 which cooperates in forming the dry chamber 107 against the shoulder therein which is adjacent the upper end of wet chamber 106. An O-ring seal 124 which is contained within an annular groove in the bore 105 adjacent the shoulder engages the cylindrical outer wall of the disk 123 and seals it to the bore. The disk 123 is retained against axial movement in bore 105 by a washer and a snap ring, the latter being seated in an annular groove in the wall of bore 105. Disk 123 is also provided with a central axial bore through which operating rod 119 extends. An O-ring 126 is inserted in a groove adjacent the top of the bore in disk 123 through which the operating rod extends and is held therein by the bottom surface of the washer. The rod 119 does not contact either the disk 123 or the washer and is supported solely by O-ring 126. By these means rod 119 is sealed with guide assembly 108 in a substantially frictionless manner, because the axial motion of rod 119 is generally in the nature of not more than two thousandths of an inch, under which conditions O-ring 126 forms an anti-friction bearing, since it tends to roll upon the rod as the latter is reciprocated.

The upper end of dry chamber 107 is closed by the previously mentioned flexible boot 109 which is inserted into bore 105 against a shoulder therein. An expansible type coil spring 127 retains boot 109 in bore 105, and the boot is provided with a thickened elastic central portion having a bore which surrounds and sealingly grips a nonmagnetic brass shaft 128 which carries rod 119.

Body element 95 is cast of a non-magnetic material such as aluminum, and is bored to receive a core 129 in which the coil 114 and thermistor 115 of the transducer-assembly are housed. Core 129 and an armature disk 130 which is positioned above it are preferably formed of material which has high magnetic permeability and low hysteresis such as an ingot iron. Core 129 is a cup-shaped cylinder having side walls 131 which provide magnetic poles and a hollow center post 132 which also provides magnetic poles. Coil 114 is embedded in an insulating plastic material in the core 129, while thermistor 115 is embedded in the same plastic material in a notch-like opening formed in the bottom of the core 129. The outside diameter of the core 129 is such as to establish a close slidable fit with bore in body element 95, and the core is provided with a peripheral flange 133 which abuts a shoulder on body element 95. Flange 133 of core 129 is clamped to body element 95 by a snap ring in a groove in body element 95.

The electromagnet above described including core 129 and coil 114 operates an armature including disk 130. This disk has a hollow hub 135 into which a tube 136 of nonmagnetic material is pressed. The armature disk 130 extends over the outside magnetic poles formed by the side walls 131, and tube 136 extends freely through the center post or poles 132 of core 129. The armature disk 130 does not contact body element 95. Shaft 128 fits snugly but axially slidably within tube 136 of the armature and its upper end is abutted by an adjusting screw 137 which is threaded into the upper end of tube 136 and which is provided with a locking nut 138. An externally threaded hollow plug 140 covering screw 137 and nut 138 is threaded into body member 95. Rotation of core 129 and armature disk 130 with respect to each other and body element 95 is prevented by a nonmagnetic pin 141 which extends through disk 130 into aligned openings in body element 95 and core 129. The opening in the armature disk 130 through which pin 141 extends is of a diameter larger than that of pin 141 so that should disk 130 contact the pin during operation of the device there will be substantially no frictional resistance between them. Pin 141 extends through disk 130 to hold it against rotation during adjustment of screw 137 and nut 138.

It is to be understood that while the above described pilot valve comprises a preferred construction, the principles of the invention are not limited to that specific valve and other specific types of electrically operated pilot valves are within the scope of the invention.

As will be explained, the armature assembly of the transducer is electromagnetically urged in a direction to close valve 100, 118 and is urged in the opposite direction by fluid pressure acting upon the bottom surface of the head 120 of valve element 118. When this fluid pressure overcomes a predetermined electromagnetic force of the transducer, the valve will be opened to a position whereat the fluid forces acting upon element 118 exactly counterbalance the counteracting electromagnetic force. Should the fluid forces acting upon valve element 118 vary in even the slightest degree, then the opening through the valve 100, 118 will be varied to maintain a desired pressure drop between inlet port 100 and outlet bore 104. It has been found during repeated tests and in the actual operation of pilot valve 13 that the valve does not tend to hunt when the electric current supplied to its coil or the pressure conditions in inlet port 100 are changed, and that the valve responds quickly even to sudden changes in electric current and/or pressure.

The force exerted by an electromagnet on an armature spaced from it is inversely proportional to the square of the distance between the armature and the poles of the magnet for a constant magnetomotive force. For this reason the coil 114 and core 129 of the transducer are preferably made large in order that there may be a wide air gap between the armature disk 130 and the poles 131 and 132, whereby in that range (0–.002 inch) in which the armature moves, the force acting upon the armature will remain substantially constant for any given magnetomotive force produced by the coil 114, and the transducer will deliver a substantially constant force within its predetermined stroke range in response to that magnetomotive force.

Coil 114 will tend to heat up under typical conditions of operation, which normally is accompanied by an increase in its resistance. Since this increase in coil resistance would diminish coil current and thereby cause the electromagnetic flux of the coil to decrease, thermistor 115 is preferably included in series with coil 114 by connection with coil lead 142. A resistor $R_T$ is connected in parallel with thermistor 115 between leads 142 and 144. The combination of coil 114, thermistor 115, and resistor $R_T$ presents a combined resistance between coil leads 143 and 144 which varies only a minimal amount with temperature, so that the overall resistance through which the pilot valve current passes is substantially constant. The combination of resistance elements will thus be understood to be equivalent to a temperature constant resistance.

FIGURE 1 shows a preferred electrical circuit 14 whereby the pilot valve 13 may be accurately controlled to maintain any flow within a desired operating range. It is to be understood that while the circuit shown forms the preferred means for energizing the pilot valve 13, the valve may be used with any other suitable source of electrical power.

The circuit 14 is designed to operate on conventional 110 volt, 60 cycle alternating current, is relatively simple and compact, and enables the operation of the pilot valve to be easily, accurately, and remotely controlled over its entire operating range. The circuit includes a power supply which is shown at the lower left portion of the figure. This power supply provides a regulated or constant direct current output at points 145 and 146. Power supply leads 147 and 148 are connectable to a conventional source of alternating current not shown.

A resistor $R_L$ is connected between lead 147 and a junction 150. A diode $D_1$, permitting current to flow to the right, is connected between junction 150 and a second junction 151, while reversely oriented diode $D_2$, permitting current flow to the left but not the right, is connected from junction 150 to a junction 152. Condenser $C_1$ is connected from junction 151 to lead 148, and condenser $C_2$ is connected in series with condenser $C_1$, from lead 148 to junction 152. Resistor $R_1$ is connected from junction 151 to the plate connection 153 of a voltage regulator tube VR. Junction 152 is connected by a lead 154 to the cathode connection 155 of tube VR.

In operation, condensers $C_1$ and $C_2$ are charged through diodes $D_1$ and $D_2$ on opposite half-cycles of the input current, so that a relatively high, fluctuating potential tends to be established between junctions 151 and 152. The voltage regulator tube VR regulates this potential so that a lower, substantially constant potential is supplied at points 145 and 146, the former being positive with respect to the latter.

Referring now to the preferred control circuit itself, which appears to the right of the power supply, leads 158 and 159 are connectable to a conventional source of alternating current, as by respective connection to leads 147 and 148. Lead 158 is connected to a variable resistor $R_2$ which has an adjustable tap 160. Tap 160 is connected to one end of the primary winding of a transformer T, the other end of the primary being connected to lead 159.

A variable resistor $R_3$ having an adjustable tap 161 is connected at one end to the power supply at 145, tap 161 being connected to a junction 162. A variable resistor $R_4$ having a tap 163 is connected to the power supply at 146 through a lead 164. Tap 163 of resistor $R_4$ is connected to junction 162, and a condenser $C_4$ is connected between junction 162 and lead 164. The secondary winding of the transformer is connected at one end to lead 164 and at the other end to lead 144. The respective taps 160, 161 and 163 of resistors $R_2$, and $R_3$, and $R_4$ are ganged as shown for simultaneous movement.

Junction 162 is connected through a diode $D_3$, which permits current flow to the right but not to the left, to a lead 165. Between lead 165 and coil lead 143 there are connected in parallel a number of variable resistors $R_a$, $R_b$, $R_c$, $R_d$, and $R_e$, each resistor having a switch $SW_a$, $SW_b$, $SW_c$, $SW_d$, and $SW_e$, respectively connected in series with it between leads 143 and 165. The taps of these resistors are respectively designated 166, 167, 168, 169, and 170. These taps are preset so that by selectively closing any of switches $SW_a$–$SW_e$, current will flow from lead 165 to lead 143 through a resistor $R_a$–$R_e$ of predetermined resistance.

The operation of the pilot valve control circuit 14 may now be explained. When energized, direct current flows from the power supply from positive connection 145 through resistor $R_3$ to tap 161, through lead 165 to whichever switch $SW_a$–$SW_e$ has been closed, through the resistor connected in series with that switch to lead 143 and coil 114. From the coil, the current flows through parallel-connected thermistor 115 and resistor $R_T$ to lead 144, then through the secondary winding of transformer T and lead 164 to negative connection 146 of the power supply. The magnitude of this current may be varied by adjusting variable resistors $R_3$ and $R_4$.

The application of an alternating potential to the primary leads of transformer T induces an alternating potential in the secondary winding of the transformer which is superimposed on the direct voltage applied to the coil 114. This alternating voltage is applied to the circuit through lead 164, condenser $C_4$ or tap 163 depending on the position of the tap along resistor $R_4$, diode $D_3$, leads 165 and 143, valve coil 114, through thermistor 115 and resistor $R_T$, and transformer secondary lead 144.

By reason of the superimposition of the alternating potential or voltage established by the transformer on the direct voltage established by the power supply, the current in coil 114 becomes a modulated or fluctuating direct current which causes the coil flux to fluctuate very rapidly about an average value and thereby minimizes or narrows the range of hysteretic variation of the core material. By adding an alternating potential or voltage component to the direct voltage, the valve response variation due to hysteresis of the core 129 may be greatly reduced, to as little as plus or minus one-half of one percent or less. The average direct voltage establishes the setting of the valve, while the alternating potential or voltage is effective to minimize the deviation about that setting which is due to the hysteresis of the core material of the transducer. Because it is desirable, in connection with the particular pilot valve 13 shown for purposes of illustration, to use a relatively large alternating potential or voltage with a low direct current component of total current and to use a relatively smaller alternating potential or voltage with a higher direct current component, the resistors $R_2$, $R_3$, and $R_4$ are ganged as shown so that the modulating voltage will be automatically reduced as the direct voltage is increased. Thus, as the taps are moved downwardly on the resistors the direct current is reduced while the alternating component is increased. While this ganging arrangement is preferred, independently adjustable variable resistors might be used or a single resistor might be substituted in place of the two separate resistors $R_3$ and $R_4$.

From the foregoing, it can be seen that the control circuit 14 is effective to supply a current to the valve coil 114 such that the magnitude of the flux established by the coil accurately determines the downward electromagnetic force exerted on the operating rod 119. This force, in turn, determines the pressure drop across valve 100, 118.

In operation, the path of fluid flow through the main flow metering apparatus 183 is from the inlet port 182 to port 43, then to the circumferential groove 50, port 44, and from port 44 to passage 185 (the outer end of which forms the high pressure pilot port), leading to ports 198 in sleeve 192. From ports 198 the fluid passes into slot 209 and upwardly in the slot to the adjustable orifice formed by it and slot 203. From this orifice the fluid flows through a passage leading to tank port 184.

The pressure compensator assembly in bore 188 maintains a constant pressure differential between the pressure at port 44 and the pressure at tank port 184, or in other words, a constant pressure drop across the adjustable orifice in bore 189, regardless of pressure fluctuations in the external system. The pressure at port 44 is reflected through passageway 60 onto the upper face of piston head 47 and through drilling 191 and bore 53 to the upper end of shank 48, while the pressure at tank port 184 is reflected into the chamber beneath piston head 47 through a bore 210. If, for example, the pressure at port 43 rises, the pressure at port 44 will also rise. A larger downward force will thereby be exerted on piston 46 in the chamber above the upper face of piston head 47 and at the upper end of shank 48 through bores 191 and 58. This force urges the piston downwardly against the force acting upwardly on it, which is the sum of the nearly constant force of low rate spring 55 and the force of the fluid beneath piston head 47. The piston 46 is moved downwardly by the altered balance of forces acting on it, so that valve 43, 51 is more nearly closed and so that a constant pressure differential is maintained between the pressures at port 44 and outlet 184. This differential is equal to the substantially constant force of spring 55 divided by the area of piston head 47.

By reason of this constant pressure differential between passageways 98 and 104 with which its inlet and outlet respectively communicate, the trimmer 13 comprises a small secondary orifice capable of very accurately controlling the total flow by-passed around fluid motor 11. For given coil current, the orifice area presented by valve 100, 118 will be constant, as will the pressure drop across it. This being so, the flow through that orifice will be constant for constant coil current. By changing coil current, the pressure drop across valve 100, 118 and the area of the orifice presented by it will be changed, so that the flow across it will be different. Flow through this orifice will establish a pressure drop thereacross, and a second drop will be established across restricted orifice 99. While changing the coil current will change the relative magnitudes of these drops, their sum will always equal the pressure differential between passageways 98 and 104. For example, when pilot valve 13 is fully open, with no current applied to coil 114, flow across the valve 100, 118 produces no pressure drop, and the entire pressure differential between bore 98 and bore 104 appears as a drop across restricted orifice 99; if large current is applied to close valve 100, 118 then there is no flow through the valve and the entire pressure drop appears across the flange 121. Thus, for any given coil current a definite, fixed trimmer flow can be specified which, when added to the fixed flow from the main flow metering assembly, establishes a constant total flow from the flow control assembly.

The system is particularly adapted, for example, to very accurately maintain the rate of rotation of a fluid motor at a constant value in spite of variations in the resistance encountered by the motor in performing work. To this end, the control circuit 14 may be coupled to the motor 11 through feed-back means such that as motor speed changes, the valve 100, 118 is automatically adjusted to permit more or less flow through the motor, thereby to bring its speed back to the desired rate of rotation. This may be done, for example, as is shown in the drawing, by driving a fly-ball governor 212 from the motor through gears 213 and 214. The governor 212 is physically connected through arm 215 to the ganged resistors $R_2$, $R_3$, and $R_4$, in such manner that as the motor 11 slows down, greater current is applied to the coil 114 of the trimmer 13 so that the valve 100, 118, is more nearly closed and less flow is passed around the motor.

While I have employed a fly-ball governor 212 to illustrate one means for carrying out a feed-back function, it is to be understood that the scope of the invention, in this respect, is intended to include any device, whether electrical, hydraulic or mechanical, which will carry out a feed-back function equivalent to that described. Those skilled in the art will understand that the principles of the invention are not limited to use with the particular main flow metering assembly, pressure compensator pilot valve, or circuitry shown, but also include other variations or modifications falling within the scope and spirit of the claims as follows.

I claim:
1. Apparatus for controlling the rate of flow of a fluid, said apparatus comprising, (a) main flow metering means, said main flow metering means comprising, a body having an inlet port, an outlet port, and an adjustable member forming an orifice with said body between said inlet port and said outlet port, said member being adjustably positionable with respect to said body to vary the area of said orifice, (b) trimmer flow metering means including a movable valve element cooperable with a control port, an inlet and an outlet, one of which includes a restricted orifice, an electromechanical transducer for supplying a force urging said valve element relative to said control port the magnitude of which force corresponds to an electrical signal applied to said transducer, (c) pressure regulator means for maintaining a constant pressure differential between fluid pressures at the inlet and outlet ports of said main flow metering means and between fluid pressures at the inlet and outlet of said trimmer flow metering means, (d) means connecting the outlet port of said main flow metering means with the outlet of said trimmer flow metering means, and (e) means responsive to the rate of flow of fluid at a point served by said apparatus for controlling the electrical signal applied to said transducer, the signal applied to said transducer determining the flow through said trimmer flow metering means to said outlet, the position of said adjustable member with respect to said body determining the flow through said main flow metering means to said outlet port.

2. Apparatus for controlling the speed of a fluid motor, said apparatus comprising, (a) main flow metering means, said main flow metering means comprising, a body having an inlet port, an outlet port, and an adjustable member forming an orifice with said body for controlling the flow from said inlet port to said outlet port, said member being adjustably positionable with respect to said body to vary the area of said orifice, (b) pressure compensator means for maintaining a constant differential between fluid pressures at said inlet and outlet ports for a given position of said member with respect to said body, (c) trimmer flow metering means including a movable valve element cooperable with a control port, an inlet and an outlet, an electromechanical transducer for supplying a force urging said valve element relative to said control port the magnitude of which force is controlled by an electrical current applied to said transducer, (d) fluid passageways including, a passageway communicating between the inlet port of said main flow metering means and the inlet of said trimmer flow metering means, and a passageway communicating between the outlet port of said main flow metering means and the outlet of said trimmer flow metering means, one of said passageways including a restricted orifice, and (e) means responsive to the speed of a fluid motor served by both of said metering means for controlling the electrical current applied to said transducer.

3. Flow control apparatus comprising, (a) main orifice means, said main orifice means comprising a body having an inlet port and an outlet port and an adjustable member forming an orifice with said body between said inlet port and said outlet port, said adjustable member being adjustably positionable with respect to said body to vary the area of said orifice, (b) pressure compensator means for maintaining a differential between fluid pressures at said inlet and outlet ports which is substantially constant for any given position of said adjustable member with respect to said body, (c) trimmer valve means having an inlet and an outlet, a movable valve element cooperable with a control port between said inlet and outlet for establishing a pressure drop, an electromechanical transducer for actuating said valve element relative to said control port to control the magnitude of said pressure drop in accordance with an electric signal applied to said transducer, said transducer supplying a force for actuating said valve element relative to said control port which force is substantially constant for a given electric signal applied to said transducer over the range of movement of said valve element relative to said control port, and (d) fluid passageways including a passageway communicating between the inlet port of said main orifice means and the inlet of said trimmer valve means and a passageway communicating between the outlet port of said main orifice means and the outlet of said trimmer valve means, one of said passageways including a fixed flow restrictor, the position of said adjustable member with respect to said body determining the flow through said main orifice means and the electrical signal applied to said transducer determining the flow through said trimmer valve means.

4. Flow control apparatus comprising, (a) main orifice means, said main orifice means comprising a body having an inlet port and an outlet port and an adjustable member forming an orifice with said body between said inlet port and said outlet port, said member being adjustably positionable with respect to said body to vary the area of said orifice, (b) trimmer valve means having an inlet and an outlet, a movable valve element cooperable with a control port between said inlet and outlet for establishing a pressure drop, an electromechanical transducer for actuating said valve element relative to said control port to control the magnitude of said pressure drop in accordance with an electric signal applied to said transducer, said transducer supplying a force for actuating said valve element relative to said control port which is constant over the range of movement of said valve element with respect to said control port for any given signal applied to said transducer, (c) a fluid passageway communicating between the inlet of said trimmer valve means and the inlet port of said main orifice means, a fluid passageway communicating between the outlet of said trimmer valve means and the outlet port of said main orifice means, one of said fluid passageways including a fixed flow restrictor, and (d) pressure compensator means for maintaining a constant pressure differential between the pressures of fluid at the inlet and outlet ports of said main orifice means.

5. Flow control apparatus comprising, (a) main orifice means, said main orifice means comprising a body having an inlet port and an outlet port and an adjustable member forming an orifice with said body between said inlet port and said outlet port, said member being adjustably positionable with respect to said body to vary the area of said orifice, (b) trimmer orifice means having an inlet and an outlet, a movable valve element cooperable with a control port between said inlet and outlet for establishing a pressure drop, an electromagnetic transducer for actuating said valve element relative to said control port to control the magnitude of said pressure drop in response to a current applied to said transducer, said transducer supplying a force urging said movable valve element toward said control port which force is substantially constant for any given current over the range of movability of said valve element relative to said control port, a fixed flow restrictor in series with said control port between said inlet and outlet, (c) pressure regulator means for maintaining a constant pressure differential between fluid pressures at the inlet and outlet ports of said main orifice means and between fluid pressures at the inlet and outlet of said trimmer orifice means, and (d) means connecting the outlet port of said main orifice means and the outlet of said trimmer orifice means.

References Cited by the Examiner
UNITED STATES PATENTS

| | | | |
|---|---|---|---|
| 2,031,478 | 2/1936 | Gray | 137—505.11 |
| 2,879,643 | 3/1959 | Stroh | 137—117 XR |
| 2,986,161 | 5/1961 | Renick | 137—501 XR |
| 3,105,671 | 10/1963 | Teitelbaum et al | 251—30 |
| 3,115,892 | 12/1963 | Brewer | 137—501 |

M. CARY NELSON, *Primary Examiner.*

MARTIN P. SCHWADRON, *Examiner.*